May 19, 1964
M. P. KOCH
3,133,664
VENT FOR RECEPTACLES
Filed Nov. 13, 1961
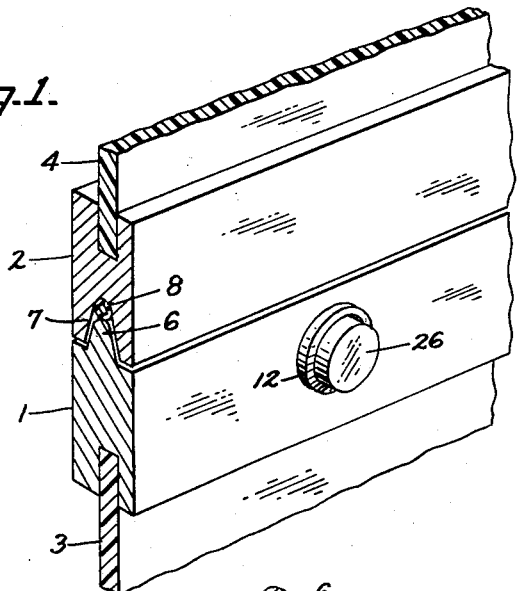
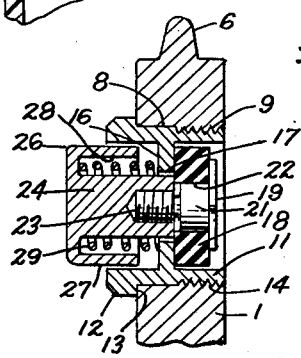
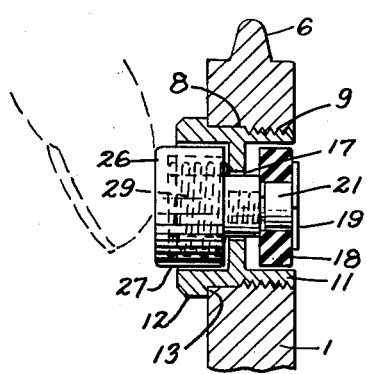
INVENTOR.
MAURICE P. KOCH
BY
*George B. White*
ATTORNEY United States Patent Office 3,133,664
Patented May 19, 1964

3,133,664
VENT FOR RECEPTACLES
Maurice P. Koch, 2224 Lake St., San Francisco, Calif.
Filed Nov. 13, 1961, Ser. No. 151,929
3 Claims. (Cl. 220—44)

This invention relates to a vent for receptacles.

The primary object of the invention is to provide a positively locked air vent for receptacles of the type which are provided with sealing strips for rendering them airtight, so as to facilitate the opening of such receptacles by equalizing the pressure therein with atmospheric pressure.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a fragmental perspective view of the sealing strips on such receptacles with my airvent in position thereon.

FIG. 2 is a cross-sectional view of my valve showing it in sealing position, and FIG. 3 is a sectional view showing the airvent depressed and open to the atmosphere.

In receptacles of this type there are a pair of sealing strips 1 and 2 respectively fixed to walls 3 and 4 of the receptacle. In the present illustration the walls 3 and 4 of the receptacles are made of fiberglass, but could be made of other materials. The male strip 1 has a rib 6 extended longitudinally thereon and substantially fits into a correspondingly tapered groove 7 in the female strip 2. At the bottom of the groove 7 is provided a compressible tube 8 which is engaged and compressed by the tip of the rib 6 as shown in FIG. 1. This provides hermetic sealing for the receptacle in spite of the fact that the closures are separable. These separable parts of the receptacle are locked together in any suitable manner.

In order to break the hermetic seal before the parts 3 and 4 are separated, I provide a structure combined with the sealing strip 1 as shown. The sealing strip 1 has a hole 8 therethrough with a threaded portion 9 into which is threaded a cylindrical housing 11, an outer flange 12 of which latter forms a shoulder 13 bearing against the outer surface of the strip 1. The outer periphery of the housing 11 has threads 14 thereon so as to threadedly secure the housing in place. The housing 11 is generally cylindrical and hollow. An abutment wall 16 extends inwardly intermediate the ends of the housing 11 and is provided with a central aperture 17.

A valve structure is provided in the housing 11. A compressible preferably rubber valve disk 18 engages the inner surface of the abutment wall 16. A holder head 19 bears against the inner face of the valve disk 18. A hub 21 extends from the head 19 into a central aperture 22 of the valve 18. A threaded end 23 of said hub 21 is threaded into a stem 24 which latter loosely extends through the aperture 17 so as to leave space or air passage around the stem 24. On the stem 24 is a button 26 formed with return flanges 27 spaced from the periphery of the stem 24 so as to form a cylindrical pocket 28. A coil spring 29 fits into the pocket 28 and bears against the outer face of the abutment partition 16 and against the bottom of the pocket 28 so as to normally urge the button 26 and the stem 24 outwardly and away from the partition 16 thereby to hold the valve disk 18 in tight sealing contact with the inner face of the partition 28 around the abutment aperture 17. The aperture 22 in the valve disc 18 is smaller than the outer diameter of the stem 24 so that no air space is left for communication between the two sides of the abutment partition 16 when the valve disc 18 is pulled in sealing position.

The outer periphery of the generally cylindrical flange 27 is of smaller diameter than the inner diameter of the housing 11 so as to leave an air space therearound for air communication when the button is pressed in the manner shown in FIG. 3.

The operation of this device is simple, as well as its structure, but it is of great importance in order to allow positive sealing and positive and quick operation because the receptacles on which this vent is used must be used in certain emergencies and then must be quickly opened without too much manipulation, and it is essential to positively and quickly equalize the pressure inside of the container or receptacle with the atmosphere so as to gain access to the contents of the receptacle.

I claim:

1. A vent for a receptacle hermetically sealed by a closure having coacting sealing strips on adjacent edges thereof,
    (a) a hollow member extending through a wall of said receptacle being fixedly secured thereto and its inner end being flush with said wall,
    (b) an abutment wall across said hollow member having a central aperture, said abutment wall being spaced from the ends of said hollow member,
    (c) a compressible sealing disk entirely within said hollow member bearing against the inside face of said abutment wall,
    (d) means extended through said disk to hold said disk against said abutment wall,
    (e) and resiliently yieldable means in said hollow member being accessible from outside of said receptacle to normally pull said holding means and said valve disk against the inside face of said abutment wall,
    (f) the spacing between said housing, said holding means and said normally pulling means being such as to provide for air communication thorugh said central aperture when said normally urging means is pressed to push said disk away from said aperture.

2. The invention defined in claim 1, wherein said housing is located in one of said sealing strips.

3. In a vent device for a receptacle covered by a closure, (a) the coacting edges of said receptacle and closure having coacting sealing strips for hermetically sealing said covered receptacles,
(b) a hollow housing fixedly secured to and extending through one of said sealing strips and being flush with said strip,
(c) an abutment wall across said housing having an aperture therethrough, said abutment wall being spaced from the ends of said housing,
(d) a valve disk entirely within said housing engaging the inner face of said abutment wall so as to seal said aperture,
(e) a stem loosely extended through said aperture,
(f) means to connect said stem to said disk,
(g) a button head on the stem within said housing spaced from the wall of said housing and projecting to the outside end of said housing,
(h) spring means in the housing normally to urge said button outwardly to pull said stem and disk into sealing position,
(i) said button head being accessible from the outside of said receptacle to be pushed inwardly of the housing to push said disk away from said wall.

References Cited in the file of this patent
UNITED STATES PATENTS

| | | |
|---|---|---|
| 297,174 | Seymour | Apr. 22, 1884 |
| 1,280,250 | Lard | Oct. 1, 1918 |
| 2,636,634 | Flubacker | Apr. 28, 1953 |